United States Patent [19]

Lai et al.

[11] Patent Number: 4,931,501

[45] Date of Patent: Jun. 5, 1990

[54] MODIFIED POLY(VINYL ALCOHOL) CONTAINING MORPHOLINOALKYLETHER GROUPS

[75] Inventors: Ta-Wang Lai, Novato, Calif.; Robert K. Pinschmidt, Jr., Allentown, Pa.; William F. Burgoyne, Jr., Emmaus, Pa.

[73] Assignee: Air Products and Chemicals, Inc., Allentown, Pa.

[21] Appl. No.: 424,433

[22] Filed: Oct. 20, 1989

[51] Int. Cl.$^5$ ................................................ C08F 8/00
[52] U.S. Cl. ........................................ 525/61; 525/60; 526/260
[58] Field of Search ...................... 525/60, 61; 526/260

[56] References Cited

U.S. PATENT DOCUMENTS 2,748,103  5/1956  Priest .................................... 260/77.5
4,675,360  6/1987  Marten ................................... 525/60

OTHER PUBLICATIONS

W. M. Brouwer et al., "Copolymers of Vinylamine and Vinylalcohol by Acid Hydrolysis of Poly (N-Vinyl--Tert Butylcarbamate-Co-Vinylacetate): Evaluation of Reactivity Ratios," J. Poly. Sci. Pol. Chem. Ed. 22, 2353-2362, (1984).

R. W. Stockman et al., "Synthesis of N-Vinylacetamide and Preparation of Some Polymers and Copolymers," Ind. Eng. Chem. Prod. Res. Dev., 24, 242-246 (1985).

*Primary Examiner*—Joseph L. Schofer
*Assistant Examiner*—J. M. Reddick
*Attorney, Agent, or Firm*—Mark L. Rodgers; William F. Marsh; James C. Simmons

[57] ABSTRACT

An amine functional copolymer of vinyl alcohol is provided by copolymerizing a vinylester with a morpholinoalkylvinylether or a morpholinoalkylallylether and then hydrolyzing the ester groups in the copolymer to hydroxy groups. The preferred copolymer is formed from vinyl acetate and morpholinoethylvinylether and 1 to 30 mol percent of the polymerized ethylene linkages in the polymer backbone contain pendant morpholinoethylether groups.

12 Claims, No Drawings

MODIFIED POLY(VINYL ALCOHOL) CONTAINING MORPHOLINOALKYLETHER GROUPS

FIELD OF INVENTION

This invention relates to an amine functional polymer which is a modified poly(vinyl alcohol) containing morpholinoalkylether groups. In another aspect it relates to a process for preparing such an amine functional polymer.

BACKGROUND OF THE INVENTION

Polymers containing amine functionality are being sought for a variety of potential uses. Such polymers represent a cost effective way of incorporating cationic charge into polymers, for example, for cationic electrocoat polymers, water treating polymers, and additives for enhanced oil recovery. Such amine functional polymers offer potential for superior adhesion to many types of substrates compared to typically neutral or anionic polymers because the functional amine group has a high electron donating ability when unprotonated and a cationic charge when protonated. By changing pH through the addition of either acid or base, these polymers can change properties to offer valuable options for viscosity control, control of emulsion stability, polymer modification for solubility, especially in water, or for a variety of systems for formulating shelf-stable polymers that are nevertheless capable of crosslinking or reacting with various substrates.

The synthesis of amine functional polymers is, however, difficult for at least two reasons. The simplest amine functional monomer, vinylamine, is thermodynamically and kinetically unstable relative to the isomeric Schiff base and condensation products of the base, ethylidine imine. Secondly, more stable allyl- and diallyl/amine monomers are expensive and typically show severe chain transfer during free radical polymerization, especially when involving allyl protons on carbon atoms alpha to the nitrogen atom in the amine. The allylamines are known to produce mainly low molecular weight polymers and copolymers even when using large amounts of free radical initiators.

In addition to having amine functionality, it is desirable that such polymers also be water soluble. It is also desirable to control the level of amine functionality, either to reduce cost by diluting the expensive amine component or for applications in which a lower level of cationic or reactive amine gives superior performance. For such reasons, it is especially desirable to develop polymers of vinyl alcohol which contain low but controlled levels of amine functionality. Other monomers which contain tertiary amine functionality, such as N,N-dialkylethylacrylamides, are expensive and polymerize poorly with vinyl acetate, the precursor to poly(vinyl alcohol).

The preparation of amine functional poly(vinyl alcohol) has been accomplished previously by copolymerizing N-vinyl-0-t-butylcarbamate, N-vinylacetamide, or N-allylurethane with vinyl acetate and then hydrolyzing the polymerized vinyl acetate component with an alcohol, such as methanol or aqueous base, followed by heating an aqueous solution of the copolymer with excess acid for an extended period of time. This procedure produces a relatively dilute aqueous solution of the polymer which is expensive to store or ship and requires expensive additional steps to isolate the polymer from solution. The aqueous solution also contains substantial amounts of undesirable salts or acid.

Copolymerizations of this general nature are illustrated by such references as U.S. Pat. No. 2,748,103 Priest (1956) which discloses copolymerization of vinyl acetate with N-allylurethane followed by hydrolysis of the acetate groups in the copolymer to hydroxy groups.

Brouwer et al., J. Pol. Sci. Pol. Chem. Ed. 22 2353-2362 (1984) discloses the hydrolysis of poly(N-vinyl-tert-butylcarbamate-co-vinyl acetate) in one to one volume mixtures of ethanol and HCl to form a copolymer of vinyl amine and vinyl alcohol. As pointed out by this reference, however, N-vinyl-tert-butylcarbamate is subject on hydrolysis to produce the toxic product, ethyleneimine. It is stated that hydrolysis of the tertiarybutylcarbamate proceeds faster than the acetate, but both are complete within 48 hours.

Stackman et al., Industrial Engineering Chemistry, Prod. Res. Dev. 24 242-246 (1985) discloses copolymerization of N-vinylacetamide with vinylacetate (VA) as well as homopolymerization of N-vinylacetamide (NVA). Hydrolysis of the poly(N-vinylacetamide) produces poly(vinylamine). Also described is the synthesis route to N-vinylacetamide using dimethylacetal and acetamide. Hydrolysis of the copolymer involves only the acetate groups initially. It is stated that hydrolysis of 20:80 NVA:VA copolymer with base went rapidly to 70% completion and then stopped. The hydrolyzed copolymers are said to have formed clear films which were tougher than those from either the unhydrolyzed copolymer or the NVA homopolymer.

U.S. Pat. No. 4,675,360, Marten (1987) describes copolymers of vinyl alcohol with poly(alkyleneoxy) acrylate and describes a method for incorporating these polyalkylene oxide side chains to act as internal plasticizers for polyvinyl alchohol. Conditions are described for copolymerizing vinyl acetate and polyalkylene acrylate monomer using free radical initiation and stripping out the unpolymerized vinyl acetate after polymerization is complete. The polymer is then hydrolyzed in methanol using catalytic alcoholysis to produce the copolymer of vinyl alcohol and poly(alkyleneoxy) acrylate containing potentially unhydrolyzed vinyl acetate groups.

SUMMARY OF THE INVENTION

According to our invention, we have provided a method of making an amine functional copolymer of vinyl alcohol which involves first copolymerizing a vinyl ester with a comonomer which can be morpholinoalkylvinylether or morpholinoalkylallylether. The structural formula of the ether comonomer can be represented as follows:

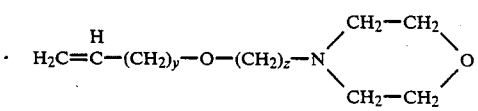

wherein y is zero or 1 and z is 2, 3 or 4. The copolymer which is formed contains about 70 to 99 mol percent of the polymerized ester units. The copolymer is then hydrolyzed so that no more than 15 mol percent of the polymerized monomeric units include ester groups, and the balance of these groups have been converted by hydrolysis to hydroxy groups. The amine functional poly(vinyl alcohol) thus formed can be recovered in solid form with about 1 to 30 mol percent of the polymerized ethylene linkages in the polymer backbone containing morpholinoalkylether groups.

The invention also provides a product which is a modified poly(vinyl alcohol) which contains morpholinoalkylether groups pendant from about 1 to 30 mol percent of the polymerized ethylene linkages in the polymer backbone. The procedure is straightforward and uses materials which are available or can be readily synthesized. The product of the process has amine functionality with no requirement for conversion of an amide to the amine. The polymers thus formed are useful in processes such as water treating, enhanced oil recovery, and papermaking. Such polymers with amine functionality which are water soluble have also been shown to be useful as a fabric size, in adding moist compressive strength to linerboard, in epoxy curatives and as a crosslinkable gelling agent.

DETAILED DESCRIPTION OF THE INVENTION

The copolymer of the vinyl alcohol which is provided by this invention contains a tertiary amine which is hydrolytically stable. The polymer is also soluble in water and can exist as a nonionic polymer or a cationic polymer depending on the pH of the solution in which it exists. Its reactivity is quite flexible since it can be protonated or deprotonated to offer a number of valuable options in viscosity control, as moist compressive strength additives, protective colloids, adhesives or flocculants. Acid hydrolysis provides a cationic product, while base hydrolysis produces a salt-free amine functional vinyl alcohol copolymer.

The monomers used in the copolymerization are vinyl acetate and either morpholinoalkylvinylether or morpholinoalkylallylether. The preferred comonomer is morpholinoalkylvinylether. The polymerization is conducted with a free radical initiator and can be either continuous or a batch process. A continuous process gives a more uniform molecular weight distribution and more uniformity of comonomer incorporation (i.e., a substantially random homogeneous copolymer), improves the lot-to-lot uniformity of the product and offers the usual commercial advantages of continuous operation. A batch process, however, allows production in simple equipment and the polymerization can be carried to a high conversion in order to avoid stripping unreacted monomer.

The vinylester can be vinyl acetate or its functional equivalent in such polymerizations, such as vinylesters of formic acid or other alkanoic acids containing 3 to 12 carbon atoms, benzoic acid or trifluoroacetic acid. The preferred vinylester is vinyl acetate.

Ideally, the polymers are prepared in a train of continuous stirred tank reactors and polymerization is followed by a hydrolysis or alcoholysis reaction. In the polymerization, the vinylester and the morpholinoalkylether monomer, a free radical catalyst and methanol are added continuously to the first reactor. The morpholinoalkylether comonomer can then be added to subsequent reactors in order to produce a homogenous copolymer. Unreacted vinyl acetate is removed by stripping, for example with methanol vapors, in a column to yield an intermediate random copolymer of the vinylester and the monomer containing the morpholinoalkylether groups.

The copolymerization can be carried out at temperatures ranging from about 45° to 130° C. but preferably will be in the range of 55 to 80° C. Operating pressures usually range from 1 to 10 atm. The polymerization is normally carried out in nonaqueous solutions, for example, with the dilution of the monomer streams with aliphatic alcohols containing 1 to 4 carbon atoms, or other solvents, such as the alkanoic esters of such alcohols. Any free radical initiator which is soluble in the reaction mixture and possesses the desired half-life at the reaction temperatures can be employed to carry out this polymerization. In addition to thermal initiators, redox initiators such as tertiary butylhydroperoxide and sodium formaldehyde sulfoxylate can be used. Suitable initiators include organic peroxides such as those described in U.S. Pat. No. 4,675,360, cited above. The morpholinoalkylether monomer is preferably polymerized as the acid salt of a mineral or organic acid. Sufficient morpholinoalkylether comonomer is used in order to produce a copolymer which contains about 70 to 99 mol percent polymerized ester units.

Unreacted vinylester is conveniently removed in the continuous process by counter-current contacting of the polymer paste solution with hot solvent. Stripping can be avoided by fully converting the monomers, which is possible in batch processes. Removal of unreacted vinylester is desirable, however, before hydrolysis because it tends to produce unacceptable levels of acetaldehyde and its condensation products. Such by-products adversely affect the color of the product and can crosslink the polyvinyl alcohol groups present to reduce polymer solubility.

While it is preferred to use only the monomers indicated above to form the copolymer of vinyl alcohol, other monomers can be incorporated also, such as the acrylate or methacrylate, crotonate, fumarate or maleate esters, vinyl chloride, ethylene. N-vinylpyrrolidine, acrylamide, styrene, and the like. The amounts of such ter-monomers should not exceed 20 mol percent of the polymer.

Hydrolysis of the copolymer of the vinyl acetate and the morpholinoalkylether monomer can be conducted either by a batch or continuous process using acid or base hydrolysis in various solvents. It is preferred, however, to use methanol with optional levels of water by way of base catalyzed transesterification. This reaction produces methyl acetate as a volatile co-product with the polyvinyl alcohol copolymer in a separate insoluble phase which is swollen with solvent. The level of hydrolysis of the vinyl acetate polymerized in the copolymer is adjusted by varying the addition of base to various levels and by varying the reaction time. Higher levels of the base catalyst, for example 1 to 3 mol percent based on the vinyl acetate groups in the copolymers, are required for the transesterification reaction than are needed for hydrolysis of polyvinyl acetate homopolymers. The hydrolysis solvent level can be varied over wide ranges but should exceed the amount required by the reaction's stoichiometry. Preferably, sufficient solvent is used to provide a low viscosity for efficient mixing of added catalyst and for heat removal. With addition of large amounts of methanol, for example, a ten-fold excess over the copolymer and efficient stirring, a powdery product is obtained which can be directly separated from the batch hydrolysis. High levels of methanol, however, give a lower polymer throughput or require large equipment.

Continuous hydrolysis of the copolymer with a base can be conveniently practiced at 20 to 60 percent polymer solids by mixing the base catalyst with the alcohol solution of the copolymer and extruding the mixture onto a moving belt. This operation is similar to that which is practiced commercially in the preparation of polyvinyl alcohol homopolymer. The hydrolyzed polymer in the form of a methanol/methyl acetate swollen gel can then be ground and rinsed with fresh methanol to remove catalyst residues and methyl acetate. The resulting methanol-swollen copolymer can then be dried to recover the desired product.

The modified poly(vinyl alcohol) contains copolymerized monomeric units which can be represented structurally by the following general formula:

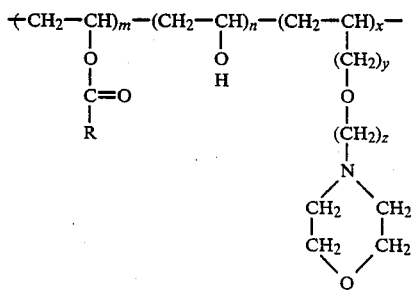

wherein m is a number representing 0 to 15 percent of the sum of m+n+x, n is a number representing 55 to 99 percent of the sum of m+n+x, x is a number representing 1 to 30 percent of the sum of m+n+x, y is zero or 1, z is 2, 3 or 4, and R is hydrogen, alkyl containing 1 to 11 carbons, phenyl, or trifluoromethyl. The monomer units are randomly interpolymerized in the mole ratios indicated by the numbers m, n and x, each of which is a positive integer. Preferably the amount of unhydrolyzed ester groups represented by the letter "m" in the above formula is from 0 to 2 percent while the amount of hydrolyzed ester groups containing hydroxyl groups and represented by the letter "n" is between 85 to 97 mol percent. In such preferred copolymer, the amount of morpholinoalkylether comonomer which has been incorporated and is represented by the letter "x" in the above formula is 3 to 15 mol percent. The alkyl linkage of the morpholino group to the ether oxygen can contain 2, 3 or 4 carbon items, but preferably this linkage is an ethylene group. When using the morpholinoalkylvinylether as the comonomer, the ether group is attached directly to the vinyl unit in the polymer backbone and when the comonomer is the allyl ether, the connecting unit is a methylene group as indicated by the above structural formula when y equals 1.

Our invention is further illustrated by the following examples which present specific embodiments of our invention but should not be construed to limit the invention unduly.

EXAMPLE 1

Preparation of 2-(4-morpholino ethyl) vinyl ether.

A solution of 339 g (3.89 mol) of morpholine, 400 g (10.00 mol) of sodium hydroxide, and 500 g of distilled water were placed in a 2 L, 3-neck flask fitted with a mechanical stirrer and condenser and heated to reflux (ca. 130° C.). A 500 g (3.50 mol) portion of 2-chloroethyl ether was then slowly added with stirring through the course of 2 hours so that excessive heat evolution would not occur. After 2 hours, an additional 100 g (1.15 mol) of morpholine was added. The reaction was maintained at reflux for an additional 4 hours. Excess morpholine and water (ca. 300 g) were distilled from the reaction flask. Upon cooling the mixture, the organic and aqueous layers were separated. The organic layer was dried over magnesium sulfate then distilled, affording 178g (1.13 mol) of product. Yield: 32%; bp 72°-78° C./4 mmHg. Structure was confirmed by NMR.

EXAMPLE 2

Preparation of Polyvinyl acetate/Polymorpholinoethylvinylether (PVAc/PMEVE)

To a 1 L resin kettle equipped with condenser, $N_2$-inlet, thermometer, thermowatch, mechanical stirrer, and heating mantle were added morpholinoethylvinylether and methanol. The solution was adjusted to the indicated pH with acetic acid (runs 1 and 2) or hydrochloric acid. The vinyl acetate was then added. The resulting solution was purged with $N_2$ for 1 hour, treated with the initiator initial charge, and then heated to 60° C. While maintaining the reaction temperature at 60° C., free radical initiator (in 30 g MeOH, 0.05 g tartaric acid) was added into the reaction mixture over 6 hours. After an additional 18 hours, the resulting polymer solution was cooled to room temperature and was directly usable for subsequent hydrolysis. Results are shown in Table 1 for nine such runs.

TABLE 1

| | | Batch Copolymerization of VAc and MEVE | | | | | | |
|---|---|---|---|---|---|---|---|---|
| | | Initial Charge | | | | Catalyst Delay | | |
| Run | Solution pH | VAC (g) | MEVE (g) | MeOH (g) | Catalyst (g) | Catalyst (g) | MeOH | % Polymer Yield | % Solid |
| 1 | 6.4 | 172 | 18.84 | 175 | 0.083 (A) | 0.5 (A) | 30 | 7.4 | 4.3 |
| 2 | 4.5 | 172 | 18.84 | 175 | 0.083 (A) | 0.5 (A) | 30 | 31.6 | 16.7 |
| 3 | 3 | 172 | 18.84 | 175 | 0.083 (A) | 0.5 (A) | 30 | 20.0 | 11.4 |
| 4 | 2 | 172 | 18.84 | 175 | 0.083 (A) | 0.5 (A) | 30 | 11.7 | 6.2 |
| 5 | 3 | 172 | 9.4 | 175 | 0.083 (A) | 0.5 (A) | 30 | 7.5 | 4.8 |
| 6 | 4.5 | 172 | 9.4 | 175 | 5.25 (B) | 0.26 (C) | 30 | 65.8 | 32.9 |
| 7 | 4.5 | 172 | 3.1 | 175 | 5.25 (B) | 0.26 (C) | 30 | 68.3 | 33.2 |
| 8 | 4.5 | 172 | 3.1 | 175 | 4.90 (B) | 0.26 (C) | 30 | — | 33.2 |
| 9 | 4.5 | 216.6 | 12.4 | 125 | 6.58 (B) | 0.33 (C) | 30 | 61.4 | 40.1 |

Catalyst (A): Trigonox (t-butylperoxyneodecanoate) Nauri
Catalyst (B): Tert-butylhydroperoxide
Catalyst (C): Sodium formaldahyde sulfoxylate

EXAMPLE 3

Hydrolysis of PVAc/PMEV

Unreacted vinyl acetate monomer in the PVAc/PMEVE polymer pastes prepared from each of the Example 2 runs was distilled off. The resulting mixtures were then diluted with methanol to give 10% solutions.

To these solutions was added KOH (0.02 eq. on VAc, in 10 g MeOH) at 65° C. over 1 hr. The polymers precipitated as powders near the end of KOH catalyst addition. After stirring for 1 hour at 65° C., the polymer powders were filtered, washed, and dried.

Other aspects and embodiments of our invention will be apparent to those skilled in the art from the above disclosure with departing from the spirit or scope of the invention.

We claim:

1. A modified poly(vinyl alcohol) containing morpholinoalkylether groups pendant from about 1 to 30 mol percent of the polymerized ethylene linkages in the polymer backbone.

2. The polymer of claim 1 wherein the vinyl alcohol units are derived from hydrolyzed vinyl ester groups and said polymer contains unhydrolyzed ester groups up to 15 mol percent of the polymerized ethylene linkages in said polymer backbone.

3. The polymer of claim 2 wherein any unhydrolyzed ester groups are acetate groups.

4. The polymer of claim 3 wherein not more than 2 mol percent of said ethylene linkages contain acetate groups and from 3 to 15 mol percent of said ethylene linkages contain morpholinoalkylether groups.

5. The polymer of claim 4 wherein said morpholinoalkylether groups are morpholinoethylether groups attached directly to the polymer backbone.

6. A modified poly(vinyl alcohol) having copolymerized monomeric units forming a structure randomly interpolymerized in a mole ratio according to the general formula:

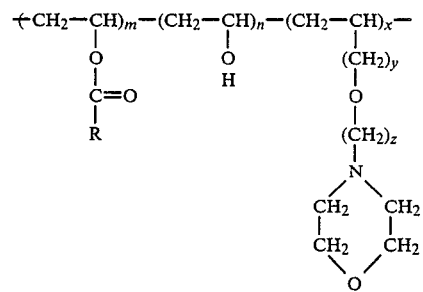

wherein m is a number representing 0 to 15 percent of the sum of m+n+x, n is a number representing 55 to 99 percent of the sum of m+n+x, x is a number representing 1 to 30 percent of the sum of m+n+x, y is zero or 1, z is 2, 3 or 4, and R is hydrogen, alkyl containing 1 to 11 carbons, phenyl, or trifluoromethyl.

7. The polymer of claim 6 wherein R is methyl.

8. The polymer of claim 6 wherein m is 0 to 2 percent, n is 85 to 97 percent, and x is 3 to 15 percent.

9. The polymer of claim 8 wherein y is zero and z is 2.

10. A method of making a vinyl alcohol copolymer containing amine functionality which comprises (a) copolymerizing a vinyl ester with a comonomer which is morpholinioalkylvinylether or morpholinoalkylvinylether to form a copolymer containing about 70 to 99 mol percent polymerized vinyl ester units, (b) hydrolyzing said copolymer of step (a) so that no more than 15 mol percent of the copolymerized monomeric units include ester groups and the balance of the ester groups of said copolymer of step (a) are converted to hydroxyl groups, and (c) recovering a solid poly(vinyl alcohol) containing morpholinoalkylether groups connected to about 1 to 30 mol percent of the polymerized ethylene linkages in the polymer backbone.

11. The method of claim 10 wherein said comonomer is morpholinoalkylallylether and said morpholinoalkylether groups are connected to said polymer backbone through a methylene group.

12. The method of claim 10 wherein said vinyl ester is vinyl acetate, said comonomer is morpholinoethylvinylether, and said hydrolyzing step (b) is carried out so that no more than 2 mol percent of the ethylene linkages in the polymer backbone contain acetate groups.

* * * * *